United States Patent [19]
Erickson et al.

[11] Patent Number: 4,970,010
[45] Date of Patent: Nov. 13, 1990

[54] VEGETABLE OIL DERIVATIVES AS LUBRICANT ADDITIVES

[75] Inventors: Frank L. Erickson, Seattle, Wash.; Robert E. Anderson, Pasadena, Calif.; Phillip S. Landis, Alexandria, Va.

[73] Assignee: International Lubricants, Inc., Seattle, Wash.

[21] Appl. No.: 282,014

[22] Filed: Dec. 9, 1988

Related U.S. Application Data

[63] Continuation-in-part of Ser. No. 221,061, Jul. 19, 1988, Pat. No. 4,925,581.

[51] Int. Cl.$^5$ ............................................. C10M 135/06
[52] U.S. Cl. .................................................... 252/48.6
[58] Field of Search ........................................ 252/48.6

[56] References Cited

U.S. PATENT DOCUMENTS

| | | | |
|---|---|---|---|
| 1,974,299 | 9/1934 | Churchill | 252/48.6 |
| 2,212,899 | 8/1940 | Flaxman . | |
| 2,450,403 | 9/1948 | Wells | 252/48.6 |
| 3,455,896 | 7/1969 | Dentterder et al. | 252/48.6 |
| 3,740,333 | 6/1973 | Hutchinson et al. | 252/48.6 |
| 3,926,822 | 12/1975 | Habiby | 252/48.6 |
| 3,986,966 | 10/1976 | Wakim | 252/48.6 |
| 4,130,495 | 12/1978 | Wisniak et al. | 252/48.6 |
| 4,134,845 | 1/1979 | Wakim . | |
| 4,149,982 | 4/1979 | Lee et al. | 252/48.6 |
| 4,152,278 | 5/1979 | Bell | 252/48.6 |
| 4,380,498 | 4/1983 | Kammann, Jr. et al. . | · |
| 4,380,499 | 4/1983 | Kammann, Jr. et al. | 252/48.6 |
| 4,487,705 | 12/1984 | Recchuite | 252/48.6 |

FOREIGN PATENT DOCUMENTS 8606371 11/1986 PCT Int'l Appl. .
557756 12/1943 United Kingdom .

OTHER PUBLICATIONS

Gisser et al., Jojoba Oil as a Sperm Oil Substitute, 1975, Wear, pp. 53–63.
Nieschlag et al., "Synthetic Wax Esters and Diesters from Crambe and Limnanthes Seed Oils," *Ind. Eng. Chem. Prod. Res. Dev.* 16:202–207 (1977).
Princen et al., "Development of New Crops for Industrial Raw Materials," *JOACS* 61:281–289 (1984).
Kammann, Jr. et al., "Sulfurized Vegetable Oil Products as Lubricant Additives," *JOACS* 62:917–923 (1985).
Chang et al., "Enrichment of Eicosenoic and Docosadienoic Acids from Limnanthes Oil," *JOACS* 54:549–552 (1977).
Hagemann et al., "Oxidative Stability of Wax Esters by Thermogravimetric Analysis," *JOACS* 56:629–631 (1979) [Hagemann et al. I].
Smith et al., "Unique Fatty Acids from *Limnanthes douglasii* Seed Oil: The $C_{20}$–Monoenes," *J. Org. Chem.* 25:1770–1774 (1960).
Miwa et al., "Fatty Acids, Fatty Alcohols, and Wax Esters from *Limnanthes douglasii* (Meadowfoam) Seed Oil," *JOACS* 39:320–322 (1962).
Miwa, "Gas Chromatograms of Synthetic Liquid Waxes Prepared From Seed Triglycerides of Limnanthes, Crame and Lunaria," *JOACS* 49:673–674 (1972).
Hagemann et al., "Comparison of Sperm Whale Oil with Three Potential Replacements on a Mini Four-Ball Wear Tester," *Lubrication Engineering* 37:145–152 (1981) [Hagemann et al. II].
Anon., "Meadowfoam: New Source of Long-Chain Fatty Acids," *JOACS* 64:1493–1498 (1987).
Bagby et al., "A Unique Fatty Acid from *Limnanthes douglasii* Seed Oil: the $C_{22}$ Diene," *J. Org. Chem.* 26:1261–1265 (1961).
Pryor, "Mechanisms of Sulfur Reactions," McGraw Hill, 98–101, 1962.

*Primary Examiner*—Olik Chaudhuri
*Assistant Examiner*—Jerry D. Johnson
*Attorney, Agent, or Firm*—David Wright Tremaine

[57] ABSTRACT

There is disclosed lubricant additives that comprise combination of vegetable oil as a triglyceride or a wax ester, sulfurized triglyceride vegetable oil or sulfurized wax ester of vegetable oil, and phosphite adducts of triglyceride vegetable oil, wax ester of vegetable oil or jojoba oil. There is also disclosed a process for sulfurizing triglyceride vegetable oil that is soluble in a lubricant base, such as mineral oil.

8 Claims, No Drawings

VEGETABLE OIL DERIVATIVES AS LUBRICANT ADDITIVES

CROSS-REFERENCE TO RELATED APPLICATIONS

This is a continuation-in-part of U.S. patent application Ser. No. 221,061, filed July 19, 1988, now U.S. Pat. No. 4,925,581.

TECHNICAL FIELD

The present invention relates to lubricant compositions and lubricant additives and to methods for producing lubricant additives with antifriction properties that contain vegetable oil and vegetable oil derivatives as lubricating agents. More specifically, this invention relates to wax esters of vegetable oil fatty acids, sulfurized vegetable oil triglycerides, sulfurized vegetable oil wax esters, vegetable oil triglycerides, phosphite adducts of vegetable oil triglycerides, and phosphite adducts of vegetable oil wax esters as lubricant additives in various combinations, and from various vegetable oil sources.

BACKGROUND OF THE INVENTION

Lubricants are widely used to reduce the friction between the surfaces of moving parts and thereby reduce the wear and prevent damage to the parts. Most lubricants are comprised principally of a base stock which is generally a relatively high molecular weight hydrocarbon. In applications where the amount of pressure applied to the moving part is quite high, lubricants which are comprised of only hydrocarbon base stock tend to fail and the contacting parts are damaged. It is well known to add materials (lubricant additives) to increase the high pressure performance of lubricants. These materials are generally called "extreme pressure additives." Examples of extreme pressure additives are sulfurized materials such as sulfurized sperm whale oil or sulfurized jojoba oil.

Wax esters can be sulfurized from natural wax esters, such as from jojoba oil, and from synthesized wax esters, such as from vegetable oil triglycerides and liberated fatty acids. Natural wax esters have produced formulated sulfurized products that provide effective lubricant additive compositions. However, the problems with the natural wax esters are availability and cost. The vegetable oils have to be transesterified from the free fatty acids to produce the wax esters. For practical applications, however, the vegetable oil triglycerides have the disadvantage that cost-adding conversion steps are necessary to form a wax ester for sulfurization, rather than a direct sulfurization of the triglyceride. These extra processing steps make vegetable oil wax esters relatively uneconomical as lubricant additives.

Princen et al., "Development of New Crops for Industrial Raw Materials," J. Amer. Oil Chemists Soc., 61: 281–89, 1984, tried to sulfurize meadowfoam oil by sulfurizing the wax esters of the meadowfoam fatty acids. Princen et al. found that sulfurization of the unaltered triglyceride oil can react with sulfur under traditional sulfurization conditions to yield factice, a solid chemical rubber and an unacceptable lubricant additive. Factice forms due to cross-linking of hydrocarbon chains by polysulfide bonds to create an insoluble material. The first sulfurized wax ester of meadowfoam oil preparation in Princen et al. had good lubrication properties, but it corroded copper, foamed excessively, and thickened excessively under in-use conditions in a hot gear box. The second sulfurized wax ester of meadowfoam oil preparation in Princen et al. was made with different synthesis conditions, but the second preparation decreased copper corrosion and maintained lubricating properties but produced more foam and did not meet a thermal stability test. The third preparation in Princen et al. used wax esters from enriched monoene and diene acids. The diene wax ester (made from monoenoic fatty acids) resulted in increased wear scar but favorable other properties.

Wakim, U.S. Pat. No. 3,986,966, after demonstrating that sulfurization of triglycerides alone gave resinous products mostly insoluble in base oils, added nonwax methyl esters of a fatty acid of 18 to 22 carbon atoms which are monounsaturated to improve the solubility of the sulfurized triglycerides.

Hutchinson et al., U.S. Pat. No. 3,740,333 refers to sulfurized blends of lard oil and a saturated wax ester, the essential element of the wax ester being derived from a $C_{10-16}$ saturated alcohol and a $C_{18-22}$ unsaturated acid.

Kammann et al., "Sulfurized Vegetable Oil Products as Lubricant Additives," J. Amer. Oil Chemists Soc., 62:917–23, 1985, found that sulfurized vegetable triglyceride oils resulted in rubbery products, in some cases even at a 12% sulfur content. Kammann et al. tried using sulfurization with large amounts of methyl lardate, but obtained factice or near factice with meadowfoam oil. Kammann et al. was able to sulfurize only by adding 10% unsaturated oleic acid before sulfurization; however, the resulting product properties were undesirable as a lubricant additive.

There are many problems using a sulfurized vegetable oil and extra expenses making a wax ester from a triglyceride vegetable oil. Therefore, there exists a need in the art to find lubricant additive compositions that can use the relatively abundant supplies of vegetable oils without resorting to the multiple processing steps of making wax esters of the fatty acids. There further exists a need in the art to be able to sulfurize triglyceride vegetable oils for use as lubricant additives.

SUMMARY OF THE INVENTION

Briefly stated, the present invention encompasses lubricant additives comprising combinations of triglyceride vegetable oil with at least one of a sulfurized vegetable oil and a phosphite adduct of vegetable oil. The vegetable oil is a triglyceride in its native state with the fatty acids having from about 16 to about 26 carbon atoms and at least one double bond, but no more than three double bonds for at least 90% of the fatty acids. Preferably, the vegetable oil fatty acids are $C_{18-22}$ with the majority of fatty acids having one double bond. Most preferably, the vegetable oil is meadowfoam oil, rapeseed oil or crambe oil.

The vegetable oil can be in the form of the native triglyceride or as a mixture with vegetable oil wax ester. The sulfurized vegetable oil comprises either a sulfurized mixture of the triglyceride form of the vegetable oil with from about 25% to about 75% of a wax ester or sulfurized vegetable oil wax ester. The wax ester for mixing with the triglyceride vegetable oil for sulfurization is jojoba oil or is derived from a $C_{18-22}$ unsaturated fatty acid and a $C_{18-22}$ unsaturated fatty alcohol. Preferably, the wax ester is a naturally occurring wax ester, such as jojoba oil, or the wax ester of meadowfoam oil or rapeseed oil. The phosphite adduct of the vegetable oil can be a mono- through hexa-adduct of the triglyceride form of the vegetable oil, or a mono- through tetra-adduct of the wax ester form of the vegetable oil.

The phosphite adduct of the vegetable oil is formed by the reaction of the native triglyceride vegetable oil or wax ester of the vegetable oil and a compound of the formula:

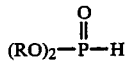

wherein R is H, $C_{1-12}$ alkyl, $C_{1-12}$ aryl, $C_{1-12}$ alkaryl, $C_{1-12}$ aralkyl, and cyclo $C_{4-12}$ alkyl. Preferably, R is $C_{4-8}$ alkyl, $C_{4-8}$ alkaryl, $C_{4-8}$ aralkyl, or cyclo $C_{4-8}$ alkyl. Most preferably, R is n-butyl.

The present invention further comprises a lubricating composition consisting essentially of a lubricant base and a lubricant additive wherein the lubricant additive comprises a mixture of at least two ingredients from different classes of ingredients selected from the group consisting of three classes of ingredients:

wherein the first class of ingredients comprises a triglyceride vegetable oil, a wax ester of the vegetable oil, and a combination thereof;

wherein the second class of ingredients comprises: a sulfurized vegetable oil wax ester; a sulfurized triglyceride vegetable oil within the range of from about 25% to about 75% vegetable oil, and from about 25% to about 75% of a wax ester, as described herein; and a combination thereof; and wherein the third class of ingredients comprises a phosphite adduct of triglyceride vegetable oil, a phosphite adduct of the vegetable oil wax ester, and a combination thereof.

DETAILED DESCRIPTION OF THE INVENTION

The present invention is a lubricant with antifriction properties, including antiwear and load-carrying properties, and comprising a lubricant base and a lubricating additive. The lubricant base stock can be selected from a large class of compounds. Most often the base is a high molecular weight hydrocarbon. The lubricant base is, preferably, a mineral oil, although synthetic hydrocarbon lubricating oils and other synthetic lubricating oils, such as ester lubricating oils and mixtures thereof (e.g., mixtures of mineral and synthetic lubricating oils), can also be used, provided that the desired proportion of lubricating additive is soluble in the lubricant base. The mineral oils include HVI (high viscosity index) oils, Bright Stock, and Bright Stock extract as well as MVI and LVI oils. The viscosity index of these oils can vary from $-150$ to 150. The 210° F. viscosities of these oils can vary from 2 to 140 centistokes. Mixtures of these oils are also suitably employed.

Examples of lubricant bases include hydrocarbon oil; synthetic hydrocarbon; an ester-based lubricant; a mineral oil; a mixture of a mineral oil and an ester-based lubricant; a mixture of mineral oil, synthetic hydrocarbon, and an ester-based lubricant; a mineral oil-based grease; and a synthetic hydrocarbon-based grease. Specifically, the base fluids are:

a. mineral oils, such as paraffinic neutral 100″, furfural-refined paraffinic oil, solvent-refined napthenic oil, and solvent-refined aromatic oil;

b. synthetic hydrocarbon oils, such as hydrogenated or partially hydrogenated polydecene and other olefins, hydrogenated hexene oligomer, hydrogenated octene oligomer, hydrogenated decene oligomer, hydrogenated $C_{6-10}$ oligomer, and hydrogenated $C_{8-10}$ oligomer;

c. ester fluids, such as pentaerythritol esters having the structures:

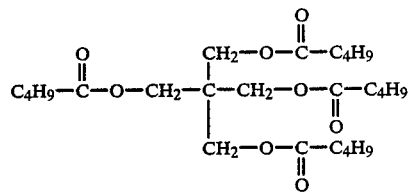

and

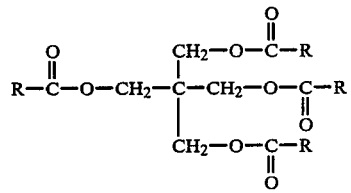

wherein R is $C_4H_9$, $C_6H_{13}$, $C_8H_{17}$, or mixtures thereof; esters of trimethylolpropane and dipentaerythritol of the structures:

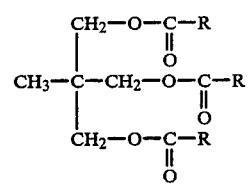

and

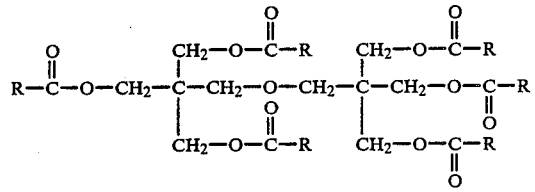

wherein R is defined as above; di-2-ethylhexyladipate; di-2-ethylhexylsebacate; didecyladipate; and didecylsebacate;

d. dialkylbenzenes, such as didocecylbenzene;

e. polyglycols, such as UCON fluids, polypropylene glycols of 1000 to 3000 molecular weight and polyethylene glycols of 1000 to 3000 molecular weight;

f. alkylaromatics; and g. dicarboxylic acids.

The lubricating additives of the present invention can be used with a variety of lubricating compositions, such as cutting fluids, precoat oils, metal-working oils, ATFs (automatic transmission fluids), gear oils, way lubricants, greases, aviation oils, textile lubricants, hydraulic oils, circulating oils, steam cylinder oils, spindle oils, fire-resistant fluids, and automotive and marine oils.

Vegetable oils useful for the present invention are a tri-ester- of three long chain unsaturated fatty acids with glycerol, a tri-hydroxy alcohol. Jojoba oil, by contrast, is a monoester of a long chain unsaturated acid and a long chain unsaturated alcohol. The fatty acids are from about 16 to about 26 carbon atoms in length and are at least monounsaturated and not more than triunsaturated for at least 90% of the vegetable fatty acids. Preferably, the vegetable oil fatty acids are $C_{18-22}$ with the majority of fatty acids being monounsaturated. Most preferably, the vegetable oil is meadowfoam oil, rapeseed oil or crambe oil. Other useful vegetable oils include: soya bean oil, peanut oil, safflower oil, sunflower seed oil, cottonseed oil, olive oil, corn oil, coconut oil, palm oil and the like.

Meadowfoam (*Limnanthes laba*) is a herbaceous winter annual plant native to the Pacific Northwest region of the United States. The common name "meadowfoam" was given because of the appearance of its solid canopy of creamy white flowers at full bloom. Meadowfoam is currently being grown commercially in Oregon's Willamette Valley.

Meadowfoam oil is extracted from meadowfoam seeds. Meadowfoam seeds are pear-shaped, consisting of a thin, brown, striated hull surrounding a relatively soft, light-colored dicotyledon kernel. The seeds, measuring about 2 x 3 mm, average about 150 to the gram. The kernels contribute about two-thirds of the total weight and contain essentially all of the triglyceride oil. Commercial meadowfoam seeds generally contain about 27% oil.

Meadowfoam oil is a triglyceride with approximately 95% of the fatty acids being $C_{20}$ and $C_{22}$ fatty acids and primarily monoenoic (single unsaturation). Further, there is a lack of conjugation of even the dienoic fatty acids as the double bonds are located far from each other. This amount of unsaturation provides for greater oxidative stability than is found in conjugated, unsaturated fatty acids. Meadowfoam oil triglyceride has the α- and α'-positions usually occupied by 5' monoenoic acids and the major fatty acids are: 5-eicosenoic, 11-eicosenoic, 5-docosenoic, 13-docosenoic, and 5,13-docosadienoic acids.

Meadowfoam oil, for example, contains about 20% diene in the acid portion of the molecule. An example of this diene structure is 5,13-docosadienoate ester of glycerol:

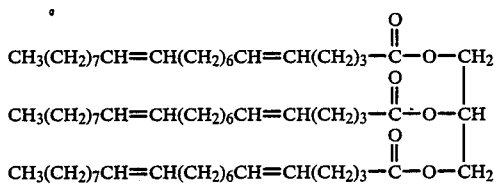

The diene structure is believed to be the major cause for problems in the art sulfurizing meadowfoam oil to a soluble product, particularly when high levels (i.e., >10% sulfur) are used. The sulfurization problem is due to crosslinking. For example, when triglyceride meadowfoam oil is sulfurized for two hours at 180° C., using 20 weight percent of sulfur using standard procedures, the resulting product is incompletely soluble in a hydrocarbon oil. This result is consistent with published observations of sulfurizing triglyceride meadowfoam oil (see Kammann et al. supra).

Rapeseed oil comes from *Brassica nopus* and typically has a fatty acid composition of:

| | |
|---|---|
| 18:1 | 13% |
| 18:2 | 11% |
| 18:3 | 5% |
| 20:1 | 10% |
| 22:1 | 55% |
| Other | 6% |

*Crambe abyssinica* (crambe oil) is native to Mediterranean countries and typically has a fatty acid composition of:

| | |
|---|---|
| 18:1 | 17% |
| 18:2 | 9% |
| 18:3 | 6% |
| 20:1 | 5% |
| 22:1 | 55% |
| Other | 8% |

The sulfurized vegetable oils of the present invention are completely soluble in hydrocarbon and comprise from about 25% to about 75% of the vegetable oil in the triglyceride form and from about 75% to about 25% of a wax ester, wherein the wax ester is jojoba oil or is derived from a $C_{18-22}$ unsaturated acid and a $C_{18-22}$ unsaturated alcohol. Preferably, the wax ester is jojoba oil or a wax ester of meadowfoam oil, rapeseed oil or crambe oil. The combination of triglyceride vegetable oil such as meadowfoam oil and jojoba oil or a wax ester can be sulfurized at high sulfur concentrations, such as 20 weight percent of sulfur. The sulfurization concentrations are from about 10% to about 25% sulfur. Preferably, the sulfur concentration is from 12% to about 20%. For example, Table 1 illustrates the solubility and copper strip test results of sulfurized combinations of triglyceride meadowfoam oil and jojoba oil (as the wax ester).

TABLE 1

Sulfurized Combinations of Meadowfoam Oil and Jojoba Oil

| Run #. | Oil (grams) | Sulfur (grams) | Solubility in 5% Mineral Oil | Copper Strip Test |
|---|---|---|---|---|
| 1. | 20 jojoba oil | 4 | soluble | 2B |
| 2. | 20 meadowfoam oil | 4 | insoluble | — |
| 3. | 20 meadowfoam oil | 3 | hazy | 3C |
| 4. | 15 jojoba oil + 5 meadowfoam oil | 4 | soluble | 2A |
| 5. | 10 jojoba oil + 10 meadowfoam oil | 4 | soluble | 2A |
| 6. | 5 jojoba oil + 15 meadowfoam oil | 4 | soluble | 1B |

The copper strip test is graded as follows: 1A, 1B, 2A and 2B are bright copper; 3A, 3B and 3C are stained copper; 4A and 4B are purple stained copper; and 5A and 5B are black copper.

A portion of the acid segment of meadowfoam oil has two double bands present. When there are two double bonds in the same acid portion of the triglyceride molecule, as for example in meadowfoam oil or rapeseed oil or crambe oil, the result on sulfurization of the triglyceride at approximately 10% sulfur concentration is to produce a solid or very viscous product with limited solubility in hydrocarbon oils. Such a solid or very viscous product would not be an acceptable lubricant additive. The solid or very viscous product is formed due to cross-linking with sulfur and each other, such that some molecules may be produced which have large quantities of sulfur and small amounts of solubilizing ester or glyceride. The preferred wax ester for adding to triglyceride meadowfoam oil for sulfurizing, jojoba oil, has two double bonds in the molecule but one double bond is in the acid portion of the molecule and the second double bond is in the alcohol portion of the molecule, far removed from the first double bond. Thus, jojoba oil behaves differently from meadowfoam oil, rapeseed oil or crambe oil.

Jojoba oil appears to be reacting with an intermediate to provide a solubilizing effect of the final product in hydrocarbon oils. A comparison of the sulfurized product of U.S. Pat. No. 3,986,966 with a saturated nonwax ester and the present invention with a wax ester (e.g., jojoba oil) and a triglyceride (rapeseed oil or meadowfoam oil) is as follows:

TABLE 2

|  | $C_{14-15}$ Alkyl Oleate | |
| --- | --- | --- |
|  | Table V of U.S. Pat. No. 3,986,966 | Jojoba Oil |
| Alcohol portion of ester | 14-15 (saturated) | 20-22 (unsaturated) |
| Fatty oil | Rapeseed | Meadowfoam |
| Ester/oil ratio | 1.22:1 | 1.22:1 |
| Sulfur, wt. % | 9.5 | 17.7 |
| Viscosity at 100° F. SUS | 2075 | 1189 |
| Copper corrosion 3 hrs. at 212° F. | 1B | 1A |
| Solubility | cloudy | clear |

Despite the use of a molecule with two double bonds, the inventive combination for sulfurizing, provide a product with superior solubility characteristics in hydrocarbon oil.

Triglyceride meadowfoam oil can be converted to the wax ester form by a process of treating the triglyceride with LiAlH$_4$ or another reducing agent into meadowfoam alcohols, such as:

$$CH_3(CH_2)_nCH=CH(CH_2)_3CH_2OH$$

wherein n is 13 or 15 and glycerol is a by-product. The meadowfoam alcohols are added to the triglyceride meadowfoam oil in the presence of acid and heat to form more glycerol as a by-product and a meadowfoam wax ester:

$$CH_3(CH_2)_nCH=CH(CH_2)_3COOCH_2(CH_2)_3CH=CH(CH_2)_nCH_3$$

wherein n is 13 or 15. Meadowfoam wax ester is structurally analogous to jojoba oil (except for the location of the double bonds) and is a mixture of long straight chain esters with 40 to 44 carbon atoms. As a structural analog to jojoba oil, meadowfoam wax esters have similar chemical properties to jojoba oil. Other vegetable oil triglycerides may be converted to the wax ester form by the same or similar processes. The resulting wax esters of rapeseed oil and crambe oil are chemically similar to the wax ester of meadowfoam oil.

Many sulfurized wax esters of vegetable oils may be used in combination with the lubricant additives of the present invention. A preferred sulfurized wax ester of a vegetable oil is the product of a reaction of the vegetable oil and 12% to 20% sulfur to yield the following:
A-S$_n$-A and

and mixtures of both, wherein n is an integer from 1 to 3, and A refers to the vegetable wax ester.

For example, twenty grams of meadowfoam wax ester was sulfurized with 4 grams of sulfur at 180° C. for 2 hours under nitrogen with stirring. The resulting sulfurized meadowfoam wax ester was soluble at a 5% concentration in mineral oil and had a 2B score in the copper strip test. Similarly, 20 grams of meadowfoam wax ester sulfurized in the same conditions with 3 grams of sulfur was soluble at a 5% concentration in mineral oil and had a 2A score in the copper strip test.

The phosphite adduct of the vegetable oil is formed by the reaction of triglyceride vegetable oil or a wax ester of a vegetable oil and a compound of the formula:

$$(RO)_2-\overset{\overset{O}{\|}}{P}-H$$

wherein R is H, $C_{1-12}$ alkyl, $C_{1-12}$ aryl, $C_{1-12}$ alkaryl, $C_{1-12}$ aralkyl, and cyclo $C_{1-12}$ alkyl. Preferably, R is $C_{4-8}$ alkyl, $C_{4-8}$ alkaryl, $C_{4-8}$ aralkyl, or cyclo $C_{4-8}$ alkyl. Most preferably, R is n-butyl.

As may be seen from the structural formulae, vegetable oil wax esters of the present invention have either two, three, or four carbon-carbon double bonds. Accordingly, the phosphite adduct of the wax ester of the vegetable oil can be either a di-adduct, a tri-adduct, or a tetra-adduct of the wax ester of the vegetable oil.

The triglyceride form of native vegetable oil can have between three and six carbon-carbon double bonds within the three fatty acids on the glycerol backbone. In extremely rare instances, there could be as many as nine double bonds. Therefore, depending upon the amount of phosphite added as a reactant for the triglyceride vegetable oil, the phosphite adduct of triglyceride vegetable oil can be a mono-, di-, tri-, tetra-, penta-, or a hexa-adduct. The penta-adduct should be a rare species and the hexa-adduct an extremely rare species according to Poisson distribution probabilities, because the frequency of dienes among the preferred vegetable oil fatty acids (i.e., meadowfoam, rapeseed, and crambe oils) is only approximately 20%. Thus, the tri-adduct should be the most common species. The preferred products are the mono-, di-, and tri-adducts.

The following are examples of species of the phosphite adduct of meadowfoam oil wax ester:

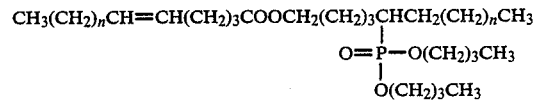

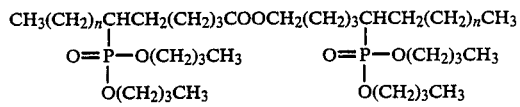

wherein n is 13 or 15.

The following are examples of species of the phosphite adduct of meadowfoam oil triglyceride:

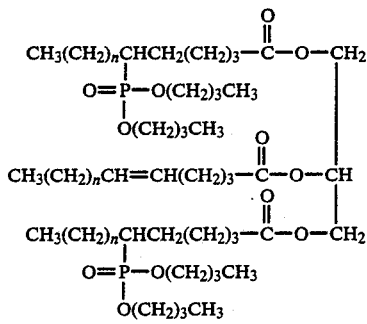

and

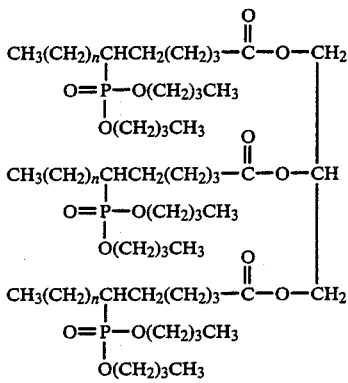

wherein n is 13 or 15.

The present invention further relates to lubricating compositions, containing a lubricant additive. Depending upon the application and the desired extent of antiwear protection, the total additive concentration will range from about 0.1% to about 25% by weight. The lubricant additive comprises a combination of a vegetable oil as the triglyceride or wax ester or a combination of both (but not necessarily from the same vegetable oil source), and at least one of a sulfurized vegetable oil, as described herein, and/or a phosphite adduct of a vegetable oil as either the wax ester or the triglyceride or a combination of both, as described herein. Preferably, the lubricant additive comprises meadowfoam, rapeseed or crambe oil as a triglyceride, meadowfoam oil triglyceride in combination with jojoba oil and sulfurized at about 20% sulfur, and the phosphite adduct of meadowfoam oil triglyceride. The inventive lubricant additive can substitute a phosphite adduct of jojoba oil as described in copending U.S. patent application Ser. No. 088,186, filed Aug. 21, 1987 and incorporated by reference herein.

Depending upon the application of the final lubricant product and the desired extent of antiwear protection desired, the total lubricant additive concentration will vary from about 0.1% to about 25% by weight. For example, a lubricant additive may contain about 0.1% to about 5.0% of a triglyceride vegetable oil, a wax ester vegetable oil or a combination of both; about 0.2% to about 10.0% of sulfurized vegetable oil as defined herein; and from about 0.1% to about 5.0% of the phosphite adduct of a vegetable oil as defined herein. Preferably, the phosphite adduct of the vegetable oil is a monoadduct of dibutylphosphite of triglyceride vegetable oil.

Different combinations and concentrations of the lubricant additive components will depend upon the desired product attributes. For example, a hydraulic oil would have a lubricant additive comprising (percentages are by weight of total product) a relatively low concentration of the sulfurized vegetable oil (as defined herein) of about 0.1% to about 0.5%, a relatively high concentration of the triglyceride vegetable oil (approximately 2%) and a relatively low concentration of the phosphite adduct of the vegetable oil (as defined herein) of approximately 0.5%. A metal cutting oil, for example, would have a lubricant additive comprising (percentages are by weight of total product) approximately 7% sulfurized triglyceride oil (as defined herein), and approximately 2% of the triglyceride vegetable oil and optionally approximately 0.5% of a phosphite adduct of the vegetable oil (as defined herein). An automotive engine oil, for example, would contain a lubricant additive comprising (percentages are by weight of total product) approximately 1% sulfurized vegetable oil (as defined herein) approximately 2% of the triglyceride vegetable oil, approximately 0.5% of the phosphite adduct of the triglyceride vegetable oil (as defined herein) and other additives as are normally used in an automotive engine oil.

The following example illustrates test model performance results from standard test including the 4-Ball Wear Test and the Falex Wear Test. The 4-Ball Wear Test assesses extreme pressure properties of the lubricant. The measurement of friction as related to rolling, drawing, and other metal-working operations depends upon the surface of the tool and workpiece and the viscosity and chemical makeup of the lubricant, as well as the pressure and temperature developed during processing. The 4-Ball wear test machine provides, under controlled testing conditions, a procedure for measuring friction. The machine consists of three balls touching each other and clamped together in a horizontal plane. A fourth ball touches three clamped balls by being positioned between the three and is driven by a motor so that it revolves in contact with the clamped balls. The rotation takes place within a reservoir containing a test lubricant. A temperature-measuring device, as well as a heater, provides a method for controlling the temperature of the test fluid. The rotating ball is loaded and then rotated for a specific time at a specific speed. At the conclusion of the test, the scar patterns developed on the balls are measured. Any stains are observed, the diameter of the scar is measured, and the coefficient of friction is calculated by dividing the tangential force by the normal force at the ball surface.

The Falex test consists of a method for measuring the torque and friction developed during rotation of a pin between two stationary V blocks. The pin as well as the V blocks can be made of various materials. The temperature of the lubricant bath into which the pin and V block are placed may also be varied. The load is applied by a ratchet arrangement. Wear measurements made above the transition pressure, that is, the load at which the lubricant film breaks down, can be a useful parameter if carried out under conditions comparable to actual operations.

The following example is offered for illustration purposes and not by way of limitation.

EXAMPLE 1

This example illustrates 4-Ball and Falex Wear Test results for a 100 SUS solvent paraffinic mineral oil base fluid without a lubricant additive and with different lubricant additives as indicated. This example compares the model test system properties of lubricant additives composed of one component as compared with lubricant additives composed of two or three components.

TABLE 3

| Lubricant | 4-Ball Wear Wear Scar Dia. (mm) | Load (lbs) | Falex lbs to Failure |
|---|---|---|---|
| Base fluid | 0.94 | 120 | 725 |
| Base fluid + 1% meadowfoam oil | 0.82 | 150 | 2600 |
| Base fluid + 2% sulfurized meadowfoam oil[a] | 0.55 | 210 | 4200 |
| Base fluid + 1% meadowfoam phosphite adduct[b] | 0.55 | 210 | 4200 |
| Base fluid + 2% sulfurized meadowfoam oil[a] + 0.5% meadowfoam phosphite adduct[b] | 0.42 | 280 | 4500 |
| Base fluid + 1% meadowfoam oil + 1% sulfurized meadowfoam oil[a] + 0.5% meadowfoam phosphite adduct[b] | 0.42 | 280 | 4500 |
| Base fluid + 1% meadowfoam oil + 0.5% meadowfoam phosphite adduct | 0.50 | 250 | 4000 |

[a] The sulfurized meadowfoam oil is a mixture of 10 grams of triglyceride meadowfoam oil and 10 grams of jojoba oil sulfurized with 4 grams of sulfur (Run #5 in Table 1).
[b] The meadowfoam phosphite adduct is a monoadduct of dibutyl phosphite with triglyceride meadowfoam oil.

The principles, preferred embodiments, and modes of operation of the invention have been described in the foregoing specification. The invention which is intended to be protected herein, however, is not to be constrained as limited to the particular forms disclosed, since these are to be regarded as illustrative rather than restrictive. Variations and changes may be made by those skilled in this art without departing from the spirit and scope of the invention.

What is claimed is:

1. A lubricant additive comprising a mixed sulfurized triglyceride vegetable oil wherein from about 25% to about 75% by weight triglyceride vegetable oil is mixed with from about 75% to about 25% by weight of an unsaturated wax ester and sulfurized, wherein the unsaturated wax ester has at least two double bonds and from about 30 to about 60 carbon atoms straight chain length and wherein the wax ester is derived from an unsaturated fatty acid and an unsaturated fatty alcohol, or the wax ester is jojoba oil.

2. The lubricant additive of claim 1 wherein the wax ester is a wax ester of meadowfoam oil.

3. The lubricant additive of claim 1 wherein the wax ester is jojoba oil.

4. A lubricant additive comprising the sulfurized product of from about 25% to about 75% by weight triglyceride vegetable oil and from about 25% to about 75% by weight of a wax ester, wherein said wax ester is derived from a $C_{18-22}$ unsaturated acid and a $C_{18-22}$ unsaturated alcohol, or said wax ester is jojoba oil.

5. The lubricant additive of claim 4 wherein the wax ester is a meadowfoam oil wax ester.

6. The lubricant additive of claim 4 wherein said sulfurized triglyceride vegetable oil comprises about 50% triglyceride vegetable oil and about 50% vegetable oil wax ester.

7. The lubricant additive of claim 4 wherein said sulfurized triglyceride vegetable oil comprises the sulfurized product of about 50% triglyceride vegetable oil and about 50% jojoba oil.

8. The lubricant additive of claim 4 wherein the vegetable oil is selected from the group consisting of meadowfoam oil, rapeseed oil, crambe oil and combinations thereof.

* * * * *